(12) United States Patent
Zinic et al.

(10) Patent No.: US 10,668,421 B2
(45) Date of Patent: Jun. 2, 2020

(54) HOUSING, FLUID OUTLET SEAL PART, HOUSING COVER, CONNECTION PART OF A DEVICE FOR SEPARATING AT LEAST ONE FLUID FROM GAS, AND DEVICE AND APPARATUS FOR SEPARATING A FLUID

(71) Applicant: MANN+HUMMEL GmbH, Ludwigsburg (DE)

(72) Inventors: Daniela Zinic, Dudenhofen (DE); Klemens Dworatzek, Edingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 16/045,815

(22) Filed: Jul. 26, 2018

(65) Prior Publication Data
US 2018/0333670 A1 Nov. 22, 2018

Related U.S. Application Data

(63) Continuation of application No. PCT/EP2017/050634, filed on Jan. 13, 2017.

(30) Foreign Application Priority Data

Jan. 28, 2016 (DE) .................. 10 2016 000 857

(51) Int. Cl.
*B01D 46/24* (2006.01)
*B01D 46/00* (2006.01)

(52) U.S. Cl.
CPC ...... *B01D 46/2411* (2013.01); *B01D 46/0015* (2013.01); *B01D 46/0031* (2013.01); *B01D 2271/027* (2013.01)

(58) Field of Classification Search
CPC ............. B01D 46/003; B01D 46/0031; B01D 46/2411; B01D 2271/027
See application file for complete search history.

(56) References Cited

U.S. PATENT DOCUMENTS

| 4,632,682 | A | 12/1986 | Erdmannsdorfer | |
|---|---|---|---|---|
| 8,025,708 | B2 * | 9/2011 | Heikamp | B01D 46/003 123/198 E |
| 8,632,617 | B2 * | 1/2014 | Munkel | B01D 46/0031 55/423 |
| 8,741,015 | B2 * | 6/2014 | Schnacke | B01D 46/0024 210/149 |
| 10,035,092 | B2 * | 7/2018 | Schmelzle | B01D 46/0002 |

(Continued)

*Primary Examiner* — Robert Clemente
(74) *Attorney, Agent, or Firm* — James Hasselbeck

(57) ABSTRACT

A housing of a device for separating fluid from gas has a first gas passage centrally arranged relative to an axis of the housing, a second gas passage arranged radially outwardly of the first gas passage, and a fluid outlet for fluid separated from the gas. The fluid outlet, relative to the axis, is arranged radially between first gas passage and second gas passage. A fluid outlet seal part of a fluid outlet sealing device is provided that is arranged fluidically between the second gas passage and the fluid outlet and interacts seal-tightly with a corresponding fluid outlet seal part of a connection part provided for connecting the housing with a connector device. The fluid outlet seal part of the fluid outlet sealing device has an annular seal section with a radially inwardly acting sealing surface and/or a radially outwardly acting sealing surface.

12 Claims, 4 Drawing Sheets

(56) References Cited

U.S. PATENT DOCUMENTS

| | | |
|---|---|---|
| 10,391,436 B2 * | 8/2019 | Schmelzle |
| 2010/0000412 A1 | 1/2010 | Heikamp |
| 2012/0167534 A1 | 7/2012 | Münkel et al. |
| 2015/0101293 A1 | 4/2015 | Dworatzek et al. |
| 2016/0030870 A1 | 2/2016 | Schmelzle et al. |
| 2017/0296957 A9 * | 10/2017 | Schmelzle ......... B01D 46/0002 |
| 2018/0104632 A1 * | 4/2018 | Schmelzle ......... B01D 46/0031 |

* cited by examiner ns, a housing cover, a connection part, a device, and an apparatus of the aforementioned kind in which a seal-tightness of connections of at least one gas passage and/or at least one fluid outlet, in particular of a liquid outlet of the housing with the connector device and/or the connection part, can be improved. In particular, it should be possible to better compensate possible especially component-based and/or assembly-based tolerances.

HOUSING, FLUID OUTLET SEAL PART, HOUSING COVER, CONNECTION PART OF A DEVICE FOR SEPARATING AT LEAST ONE FLUID FROM GAS, AND DEVICE AND APPARATUS FOR SEPARATING A FLUID

CROSS-REFERENCE TO RELATED APPLICATIONS

This application is a continuation application of international application No. PCT/EP2017/050634 having an international filing date of 13 Jan. 2017 and designating the United States, the international application claiming a priority date of 28 Jan. 2016 based on prior filed German patent application No. 10 2016 000 857.1, the entire contents of the aforesaid international application and the aforesaid German patent application being incorporated herein by reference.

BACKGROUND OF THE INVENTION

The invention concerns a housing of a device for separating at least one fluid, in particular oil, from gas, in particular air, in particular of an air/oil separator box or of an air/oil separation element, in particular of a compressor, of a compressed air device, or of a vacuum pump, with at least one first gas passage that is arranged centrally relative to an axis, with at least one second gas passage that is arranged radially outwardly of the at least one first gas passage relative to the axis, and with at least one fluid outlet for fluid separated from the gas that is arranged, radially relative to the axis, between the at least one first gas passage and the at least one second gas passage, wherein, fluidically between the at least one second gas passage and the at least one fluid outlet, at least one housing-associated fluid outlet seal part of at least one fluid outlet sealing device is arranged that can interact seal-tightly with at least one corresponding connection-associated fluid outlet seal part of a connection part that is provided for connecting the housing to the connector device.

The invention concerns moreover a fluid outlet seal part of a fluid outlet sealing device of a housing or for a housing of a device for separating at least one fluid, in particular oil, from gas, in particular air, in particular of an air/oil separator box or an air/oil separation element, in particular of a compressor, of a compressed air device, or of a vacuum pump, wherein the housing-associated fluid outlet seal part is arranged or can be arranged fluidically between at least one gas passage and at least one fluid outlet in such a way that it can interact seal-tightly with at least one corresponding connection-associated fluid outlet seal part of a connection part that is provided for connecting the housing to a connector device of the device.

The invention concerns furthermore a housing cover of a housing of a device for separating at least one fluid, in particular oil, from gas, in particular air, in particular of an air/oil separator box or an air/oil separation element, in particular of a compressor, of a compressed air device, or a vacuum pump, with at least one first gas passage that is centrally arranged relative to an axis, with at least one second gas passage that is arranged radially outwardly of the at least one first gas passage relative to the axis, and with at least one fluid outlet for fluid separated from the gas that is arranged, radially relative to the axis, between the at least one first gas passage and the at least one second gas passage, wherein, between the at least one second gas passage and the at least one fluid outlet, at least one housing-associated fluid outlet seal part of at least one fluid outlet sealing device is arranged or can be arranged that can interact seal-tightly with at least one corresponding connection-associated fluid outlet seal part of a connection part that is provided for connecting the housing with the connector device.

The invention concerns incidentally a connection part for connecting a device for separating at least one fluid, in particular oil, from gas, in particular air, in particular of an air/oil separator box or of an air/oil separation element, in particular of a compressor, of a compressed air device, or of a vacuum pump, with a connector device, comprising at least one gas-conducting chamber for at least one first gas passage of a housing of the device.

The invention concerns moreover a device for separating at least one fluid, in particular oil, from gas, in particular air, in particular an air/oil separator box or an air/oil separation element, in particular of a compressor, a compressed air device, or of a vacuum pump, with a housing with at least one first gas passage that is arranged centrally relative to an axis, with at least one second gas passage that is arranged radially outwardly of the at least one first gas passage relative to the axis, and with at least one fluid outlet for fluid separated from the gas that is arranged, radially relative to the axis, between the at least one first gas passage and the at least one second gas passage, wherein, between the at least one second gas passage and the at least one fluid outlet, at least one housing-associated fluid outlet seal part of at least one fluid outlet sealing device is arranged that is interacting seal-tightly with at least one corresponding connection-associated fluid outlet seal part of a connection part that is provided for connecting the housing with the connector device, and with at least one filter and/or separation element that is arranged or can be arranged in the housing such that it separates at least one first gas passage and at least one second gas passage.

The invention concerns finally an apparatus for separating at least one fluid, in particular oil, from gas, in particular air, in particular an air/oil separator box or an air/oil separation element, in particular of a compressor, of a compressed air device, or of a vacuum pump, with at least one connector device with which the at least one device for separating the at least one fluid is connected or can be connected.

DE 10 2014 000 281 A1 discloses a cup-shaped housing for a device for separating liquid from air, as well as an associated apparatus. The housing cover comprises at least one clean air-side opening for discharging the filtered clean air. The housing cover comprises at least one raw air inlet at a raw air side for supply of raw air. For sealing between the raw air side and the clean air side, in particular of the raw air inlet at a raw air-side from the opening at the clean air side, at least one sealing surface is arranged at least partially at the exterior side of the housing cover which is facing away from the interior of the cup-shaped housing.

The invention has the object to configure a housing, a fluid outlet seal part, a housing cover, a connection part, a device, and an apparatus of the aforementioned kind in which a seal-tightness of connections of at least one gas passage and/or at least one fluid outlet, in particular of a liquid outlet of the housing with the connector device and/or the connection part, can be improved. In particular, it should be possible to better compensate possible especially component-based and/or assembly-based tolerances.

SUMMARY OF THE INVENTION

This object is solved with the housing in accordance of the invention in such a way that at least a housing-associated fluid outlet seal part comprises at least one annular sealing section with at least one at least radially inwardly acting, in particular radially inwardly projecting, sealing surface and/or with at least one at least radially outwardly acting, in particular radially outwardly projecting, sealing surface.

At least a housing-associated fluid outlet seal part of at least one fluid outlet sealing device is arranged between the at least one second outer gas passage and the at least one fluid outlet. The at least one housing-associated fluid outlet seal part can interact seal-tightly with at least one corresponding connection-associated fluid outlet seal part of the connection part. With the at least one fluid outlet sealing device, the at least one second gas passage can be sealed relative to the at least one fluid outlet. In this way, the risk can be reduced that gas from the at least one second gas passage can reach the at least one fluid outlet and/or separated fluid from the at least one fluid outlet can reach the at least one second gas passage. The at least one housing-associated fluid outlet seal part can advantageously be a seal or can at least comprise one.

According to the invention, at least a housing-associated fluid outlet seal part comprises at least one at least radially inwardly acting sealing surface. Alternatively or additionally, the at least one housing-associated fluid outlet seal part can comprise at least one at least radially outwardly acting sealing surface. When connecting the housing with the connection part and/or the connector device, the at least one housing-associated fluid outlet seal part and the at least one connection-associated fluid outlet seal part can contact each other at least in radial direction.

Radially acting sealing surfaces enable a greater axial position tolerance in comparison to exclusively axially acting sealing surfaces. The at least one housing-associated fluid outlet seal part acting sealingly at least in radial direction is therefore of great advantage in combination with a screw connection, a plug-in connection, a rotary insertion connection or another type of connection at least with an axial movement proportion relative to the axis for connection of the housing with the connection part.

Advantageously, at least a housing-associated fluid outlet seal part and at least a connection-associated fluid outlet seal part can be coaxial, in particular coaxial to the axis. In this way, the corresponding fluid outlet seal parts can be more easily inserted into each other. The fluid outlet seal parts can easily glide along each other in this context.

In case of a radial inwardly or outwardly projecting sealing surface, the latter can be designed, for example, as a radially inwardly or outwardly projecting bead with preferably convex shape that at least partially forms the sealing surface, i.e., in the form of a section of an O-ring. Alternatively or additionally, a radially inwardly or outwardly projecting, in particular elastic sealing lip can be provided which comprises the sealing surface in particular at its end region. Advantageous in this context is in particular that the part of the fluid outlet seal part which provides the sealing surface is projecting somewhat radially past regions of the fluid outlet seal part adjoining this part so that a defined seal-tight contact at a cylindrical counter surface is enabled at the sealing surface.

Advantageously, at least an annular sealing section of the at least one housing-associated fluid outlet seal part can comprise at least one sealing surface which is acting axially relative to the axis. In this way, an axial sealing action can be produced in addition to the radial sealing action. As a whole, the seal-tightness can be improved in this way.

Advantageously, at least a housing-associated fluid outlet seal part can be at least partially elastic. In this way, the at least one housing-associated fluid outlet seal part can adapt more easily to the corresponding at least one connection-associated fluid outlet seal part. Moreover, tolerances can be compensated and/or vibrations can be dampened more easily and better in this way. The housing-associated fluid outlet seal part, in particular the sealing section and/or the sealing surface, is preferably configured in this context to be elastically widenable in case of a radially inwardly acting sealing surface. Further preferred, the configuration is such that during assembly the seal in the region of the sealing surface is widened radially in outward direction elastically so that the pressure force, which is required for reaching seal-tightness, is generated decisively by the elastic expansion.

Advantageously, at least a housing-associated fluid outlet seal part can be comprised of an elastic, in particular fluid-resistant material, in particular fluororubber (FKM), or can at least comprise such a material.

The connection part serves for connecting the housing with the connector device, in particular with corresponding fluid conduits and/or gas conduits. At least a part of the connection part can be part of the housing or can be connected with it fixedly or detachably, in particular preassembled. Alternatively or additionally, at least a part of the connection part can be part of the connector device or can be fixedly or detachably connected therewith, in particular preassembled. Correspondingly, the at least one connection-associated fluid outlet seal part can be fixedly or detachably connected with the connection part and/or the connector device.

The at least one housing-associated fluid outlet seal part can be interacting with the at least one connection-associated fluid outlet seal part in particular automatically seal-tightly as soon as the housing is appropriately connected with the at least one corresponding fluid outlet seal part of the connection part and/or of the connector device.

The connector device can be advantageously a connector head. The connector head can be provided with corresponding inlet lines and/or discharge lines for the gas and/or the separated fluid.

Advantageously, the connection part can comprise a tube-like, in particular cylindrical and/or conical, connector socket, connector section or tube socket. The tube-like connector socket, in particular when it is detachably connectable at the connection side and/or housing side, can also be referred to as nipple or connecting nipple. A nipple, connecting nipple or tube socket is hollow at the inside. In this way, with the at least one connection part a fluid conduit, in particular gas conduit, can be realized in addition. With the connection part, a mechanical connection as well as a fluid-conducting connection can be realized between the housing and the connector device.

Advantageously, the housing can be connected by means of a rotary and/or insertion connection with the connector device. The rotary and/or insertion connection can advantageously be rotatable and/or insertable relative to the axis. Advantageously, the axis can be coinciding with an assembly axis of the housing with the connector device, in particular of the housing with the connection part and/or of the connection part with the connector device. The housing can be screwed in particular by means of a screw connection directly or indirectly in particular by means of the connection part into or on the connection device. A screw connection is a combined rotary/insertion connection in which an insertion movement is realized by a rotary movement.

Advantageously, the axis can be coaxial or parallel to a housing axis of the housing, in particular of a housing pot and/or a housing cover, and/or an element axis of a filtering and/or separating element arranged in the housing. Advantageously, the axis can be coaxial to an axis of the connection part.

The connection part can comprise at least one connection element for connecting with the housing and/or the connector device, in particular by means of a rotary and/or insertion connection, in particular of a screw connection, of an insertion connection, of a clamping connection, of a locking connection and/or of a bayonet-type connection or the like. In particular, the connection part can comprise at least one outer thread and/or at least one inner thread. Correspondingly, the housing and/or the connector device can comprise at least one matching inner thread and/or at least one outer thread. The threads can be advantageously coaxial to the axis.

The housing can advantageously be cup-shaped or pot-shaped. Advantageously, the housing, in particular the housing pot, can be closed off at an end face with a housing cover. Advantageously, the connection part and/or the connector device is connected or can be connected in particular as needed with the housing cover at an end face.

Advantageously, the housing, in particular the housing pot and/or the housing cover, is comprised of metal and/or plastic material or at least can comprise one of these materials.

Advantageously, at least one filtering and/or separating element, in particular at least one filter element, at least one coalescing element, at least one separating or baffle wall and/or a cyclone or the like or a combination of different separating elements, can be arranged in the housing. With the at least one filtering and/or separating element, the fluid can be separated from the gas. In addition or alternatively, particles possibly contained in the gas can be filtered out with the at least one filtering and/or separating element. At least one filtering and/or separating element can be designed as a filter element, in particular air filter element.

Advantageously, in case of at least one filtering and/or separating element, at least one filter medium can be combined or joined with at least one separating medium, in particular a coalescing medium, for the fluid, in particular a liquid. In this way, the required space can be reduced.

Advantageously, at least a filtering and/or separating element, in particular a filter medium and/or a coalescing medium, can surround the axis circumferentially, in particular in a closed form.

Advantageously, in operation of the device for separating a fluid, the at least one first gas passage can be provided for a gas flow which, relative to an interior of the housing, is oriented opposite to a gas flow through the at least one second gas passage. Advantageously, the at least one first gas passage can be a gas outlet for treated gas. The at least one second gas passage can accordingly be a gas inlet for gas to be treated. Alternatively, the at least one first gas passage can be a gas inlet and the at least one second gas passage a gas outlet.

Advantageously, at least a first gas passage can be arranged coaxially to the axis.

At least one filtering and/or separating element can advantageously be arranged between at least one gas inlet and at least one gas outlet and can separate them from each other. In this way, the at least one filtering and/or separating element can be mandatorily flowed through by the gas.

The gas can flow through the at least one filtering and/or separating element relative to the axis in a radial direction from the exterior to the interior or in opposite direction, depending on which one of the gas passages serves as gas inlet and which one as gas outlet.

The at least one fluid, in particular a liquid such as oil, can be separated from the gas by the at least one separating element. The fluid, following the force of gravity, can sink in downward direction into a lower region of the housing.

Advantageously, the at least one fluid outlet can be guided in a lower region out of the housing. The separated fluid can exit through the at least one fluid outlet from the housing in this way. The at least one fluid outlet can be connected with a fluid channel, in particular in or at the connection part and/or the connector device.

Advantageously, the at least one housing-associated fluid outlet seal part can be arranged at an end face of the housing, in particular as needed at the housing cover.

Advantageously, the at least one housing-associated fluid outlet seal part can extend circumferentially relative to the axis at least partially.

Advantageously, the at least one housing-associated fluid outlet seal part can surround the axis so as to be circumferentially closed.

Advantageously, the at least one housing-associated fluid outlet seal part, in particular a sealing section, can surround circumferentially, in particular circumferentially closed, at least one section of the at least one fluid outlet that is in particular downstream relative to the fluid flow.

Advantageously, relative to the axis, the at least one second gas passage can be arranged radially outwardly of the at least one housing-associated fluid outlet seal part.

Advantageously, a plurality of second gas passages can be arranged about the circumference, in particular uniformly distributed relative to the axis.

Advantageously, at least a first gas passage, at least a second gas passage, and at least a fluid outlet can be arranged at the same end face of the housing, in particular at or in the housing cover. In this way, a connection of the housing with the connecting part and/or the connector device can be realized in a simpler and/or more space-saving manner.

Advantageously, the invention can be used in connection with a gas/oil separation device, in particular an air/oil separation device, in particular with a so-called air/oil separator box or a so-called air/oil separation element. With a gas/oil separation device, oil droplets that are possible entrained in the gas can be separated and removed. Such gas/oil separation devices can advantageously be used for compressors, vacuum pumps or compressed air devices. They can be arranged fluidically upstream of a gas inlet of the corresponding device. In this way, the gas can be de-oiled before it reaches the device. Alternatively or additionally, at least one gas/oil separation device can be arranged fluidically downstream of a gas outlet of the device. In this way, the oil which in particular in operation of the device can be introduced into the gas can be removed after exiting from the device. Advantageously, the connector device can be provided with corresponding gas conduits.

The invention can also be employed in connection with an internal combustion engine, in particular an intake manifold for combustion gas, in particular combustion air, or a crankcase venting device. The invention can be used in internal combustion engines of motor vehicles or other types of internal combustion engines, in particular industrial engines. It can be used also outside of internal combustion engines, in particular in motor vehicles.

Instead of in a device for separating oil, the invention can also be used for separating other types of fluids from gas. It can also be used in connection with a room air device or air-conditioning device.

Advantageously, at least between at least one second gas passage and an environment, at least a housing-associated environmental seal part of at least one environmental sealing device can be arranged. The at least one housing-associated environmental seal part can be interacting seal-tightly with at least one corresponding in particular connector-associated and/or connection-associated environmental seal part of the connector device and/or of the connection part. With the environmental sealing device, the at least one second gas passage can be sealed relative to the environment. The space that is surrounding the housing in its mounted position at the connector device is considered the environment.

The at least one second gas passage, relative to the axis, can be positioned radially relatively far outwardly. In particular, relative to the axis it can be positioned father outwardly than the at least one fluid outlet and/or the at least one first gas passage.

Advantageously, the housing-associated environmental seal part can comprise at least one seal and/or at least one sealing surface. Correspondingly, the at least one, in particular connector-associated and/or connection-associated environmental seal part can comprise at least one sealing surface and/or at least one seal.

Advantageously, the at least one housing-associated environmental seal part can interact seal-tightly at least axially with the at least one in particular connector-associated environmental seal part. In this way, a securing force of the housing at the connector device and/or the connection part, which is oriented parallel to the axis, can compress the environmental seal parts more strongly. In this way, a sealing action can be improved.

Advantageously, at least one housing-associated environmental seal part and at least one housing-associated fluid outlet seal part can be arranged at the same end face of the housing, in particular at the housing cover.

Advantageously, at least one housing-associated environmental seal part can surround circumferentially at least partially at least one housing-associated fluid outlet seal part relative to the axis. In this way, the at least one first gas passage and the as least one fluid outlet can also be sealed relative to the environment.

The at least one environmental sealing device can also be referred to as outer sealing device and the corresponding seal parts as outer seal parts. Correspondingly, the at least one fluid outlet sealing device can be referred to as inner sealing device and its seal parts as inner seal parts.

Advantageously, the combination of the at least one at least radially acting fluid outlet sealing device and the at least one at least axially acting environmental sealing device can permit greater dimensional tolerances in the device for separating at least one fluid, in particular the housing and/or the connector device.

In an advantageous embodiment, radially outwardly of at least one housing-associated fluid outlet seal part relative to the axis at least in the region of a radial inner sealing surface, it is possible to provide no support means, in particular of the housing and/or of the connector device and/or of the connection part, for radially supporting the at least one housing-associated fluid outlet sealing part. In this way, no additional support means are required so that an assembly expenditure and/or the required space can be reduced. A gas pressure or fluid pressure can be acting at the radial outer circumferential side of at least one housing-associated fluid outlet seal part. With the gas pressure or fluid pressure, the at least one radial inner sealing surface can be pressed more strongly against the corresponding sealing surface of the connection-associated fluid outlet seal part. In this way, a sealing action can be improved.

In a further advantageous embodiment, at least one annular sealing section, at least in portions thereof, can have a convex concave cross section. Due to the corresponding curvature of the at least one annular sealing section, a fluid pressure can act better on it. The sealing action can thus be improved.

Advantageously, the concave side can be located on the part of at least one sealing surface, in particular a radial inner sealing surface. In this way, the at least one annular sealing section can be pushed more easily onto a corresponding connection-associated fluid outlet seal part. With the corresponding profile of the annular sealing section, in case of an at least partially elastic sealing section an elastic mechanical tension can be built up by means of which a sealing action is reinforced. Moreover, an outer pressure can attack better at the radial outer circumferential side of the annular sealing section and further increase the sealing function in this way. The at least one annular sealing section can be curved in radial outward direction.

In a further advantageous embodiment, at least one housing-associated fluid outlet seal part can comprise at least one fastening section with which it is fastened or can be fastened to at least one housing part. Advantageously, at least one fastening section can comprise at least one insertable fastening means. Insertable fastening means can be simply inserted into corresponding openings of the at least one housing part.

Advantageously, at least the housing-associated fluid outlet seal part is fastened or can be fastened with at least one fastening section to a housing cover of the housing.

In a further advantageous embodiment, at least one fastening section can comprises at least one hollow fastening nipple. A fastening nipple can be designed as an insertable fastening means. The hollow interior of the fastening means can serve as a fluid channel. In this way, the at least one fastening nipple can at the same time act as a fastening means and as a passage for fluid. The at least one fastening nipple can thus be inserted into a corresponding fluid opening, in particular an oil drain hole, of a corresponding housing part. In this way, it is made possible that the fluid can flow through the fluid opening, i.e., through the hollow interior of the fastening nipple inserted therein.

In a further advantageous embodiment, at least one fluid outlet can be configured for connection with at least one fastening section of at least one housing-associated fluid outlet seal part. Accordingly, the at least one fluid outlet can serve additionally for attaching the at least one housing-associated fluid outlet seal part.

Advantageously, at least one fluid outlet can be configured for receiving at least one fastening nipple. Advantageously, the at least one fastening nipple can be inserted into the at least one fluid outlet.

In a further advantageous embodiment, at least one connection-associated fluid outlet seal part can comprise at its radial outer circumferential side relative to the axis at least one step whose radially inwardly positioned circumferential side comprises a radially outwardly oriented connection-associated sealing surface for interaction with at least one radially inwardly acting sealing surface of at least one housing-associated fluid outlet seal part. An annular sealing section of the at least one housing-associated fluid outlet seal part can be pushed in axial direction relative to the axis onto the radially inwardly positioned circumferential side of the at least one step. The radially inwardly acting sealing surface in this context can contact, acting seal-tightly in radial direction, the radially outwardly oriented connection-associated sealing surface.

Advantageously, a radially extending part of the at least one step can comprise an axially oriented connection-associated supporting and/or sealing surface. At the axially oriented connection-associated supporting and/or sealing surface an end face of the annular sealing section of the at least one housing-associated fluid outlet seal part can rest and/or be supported in particular seal-tightly. In this way, a sealing function acting in axial direction can be achieved also.

In a further advantageous embodiment, at least a first gas passage can comprise a mounting opening for at least one connection part. Into the mounting opening, the at least one connection part can be inserted. The at least one connection part can extend through the mounting opening and extend into an interior of the housing and/or of at least one filtering and/or separating element.

Advantageously, an axis of the at least one connection part, when the housing is mounted, can extend axially, in particular coaxially, relative to the axis. For assembly, the at least one connection part can thus be guided axially relative to the axis through the mounting opening.

The at least one connection part can advantageously be connected by means of a rotary and/or insertion connection, in particular, a screw connection, with the mounting opening.

Advantageously, a radial outer circumferential side of the at least one connection part can comprises an outer thread which, for connection with the housing, can be screw-connected with a corresponding inner thread in the region of the mounting opening.

Advantageously, at least one fluid outlet can comprise at least one through opening.

Advantageously, at least one through opening can be separated by material from the at least one mounting opening. Advantageously, at least one fluid outlet can be spaced from the at least one mounting opening radially relative to the axis. At least one material section, in particular a material stay, of the housing, in particular of the housing cover can be located between the at least one mounting opening and the at least one fluid outlet. The material section can separate the mounting opening from the fluid outlet. In particular when using a screw connection between the connection part and the housing, the inner thread can thus interact circumferentially uniformly and circumferentially closed with the outer thread of the connection part in the region of the axis.

In a further advantageous embodiment, at least one gas passage and/or at least one fluid outlet and/or at least one housing-associated fluid outlet seal part and/or at least one housing-associated environmental seal part can be realized in/at/with a housing cover of an in particular cup-shaped housing. In this way, the aforementioned components can be realized simply at the housing cover. The housing cover can be realized and/or preassembled independent of the remainder of the housing, in particular the housing pot.

When assembling the device for separating the fluid, a corresponding separating and/or filter element can be simply introduced into the housing. Subsequently, the housing can be closed off with the housing cover.

The preassembled housing can be provided simply with the connection part. Alternatively, the connector device can be provided with the connection part. Subsequently, the housing and the connector device can be connected. In this context, the connection part is correspondingly connected with the respective other component. When connecting, automatically the gas passages and the at least one fluid outlet can be connected with the corresponding gas channels and fluid channels of the connection part and/or the connector device. Also, depending on the assembly method, the fluid outlet seal part and optionally the environmental sealing device can be automatically activated, respectively, in the same assembly step or in different assembly steps.

Moreover, the object is solved according to the invention with the fluid outlet seal part in that the housing-associated fluid outlet seal part comprises at least one annular sealing section with at least one radially inwardly acting sealing surface and/or with at least one radially outwardly acting sealing surface.

Also, the object is solved according to the invention with the housing cover in that at least one fluid outlet is configured for receiving at least one fastening nipple of at least one housing-associated fluid outlet seal part.

Incidentally, the object is solved according to the invention with the connection part in that the connection part comprises at least one fluid passage, or at least forms it partially, for at least one fluid outlet of the housing for fluid separated from the gas, which is arranged outside of the at least one gas-conducting chamber, wherein on a side of the at least one fluid outlet which is facing away from the gas-conducting chamber at least one connection-associated fluid outlet seal part of at least one fluid outlet sealing device is arranged that can interact seal-tightly with at least one corresponding housing-associated fluid outlet seal part.

The connection part comprises at least one connection-associated fluid outlet seal part, in particular at least one sealing surface and/or a seal receptacle, in particular a step, for at least one seal and/or at least one seal, of at least one fluid outlet sealing device that relative to the axis can interact seal-tightly at least in radial direction with at least one housing-associated fluid outlet seal part of the at least one fluid outlet sealing device.

Advantageously, the at least one connection-associated fluid outlet seal part can comprise at least one sealing surface that relative to the axis is at least radially oriented, in particular extends circumferentially and axially. Advantageously, the at least one sealing surface can have the shape of a cylinder wall, in particular circular cylinder wall.

Moreover, the object is solved according to the invention with the device for separating a fluid in that at least one housing-associated fluid outlet seal part comprises at least one annular sealing section with at least one radially inwardly acting sealing surface and/or with at least one radially outwardly acting sealing surface.

Moreover, the object is solved according to the invention with an apparatus with a housing according to the invention and a device according to the invention.

Incidentally, the features and advantages that have been disclosed in connection with the housing according to the invention, the fluid outlet seal part according to the invention, the housing cover according to the invention, the connection part according to the invention, the device according to the invention, and the apparatus according to the invention and their respective advantageous embodiments apply correspondingly among each other and vice versa. Of course, the individual features and advantages, can be combined with each other wherein further advantageous effects may result which go beyond the sum of the individual effects.

BRIEF DESCRIPTION OF THE DRAWINGS

Further advantages, features, and details of the invention result from the following description in which an embodiment of the invention will be explained in more detail with the aid of the drawing. A person of skill in the art will consider the features disclosed in combination in the drawing, the description, and the claims expediently also individually and combine them to further meaningful combinations.

In the Figures, same components are provided with same reference characters.

DESCRIPTION OF PREFERRED EMBODIMENTS

Figure 1:
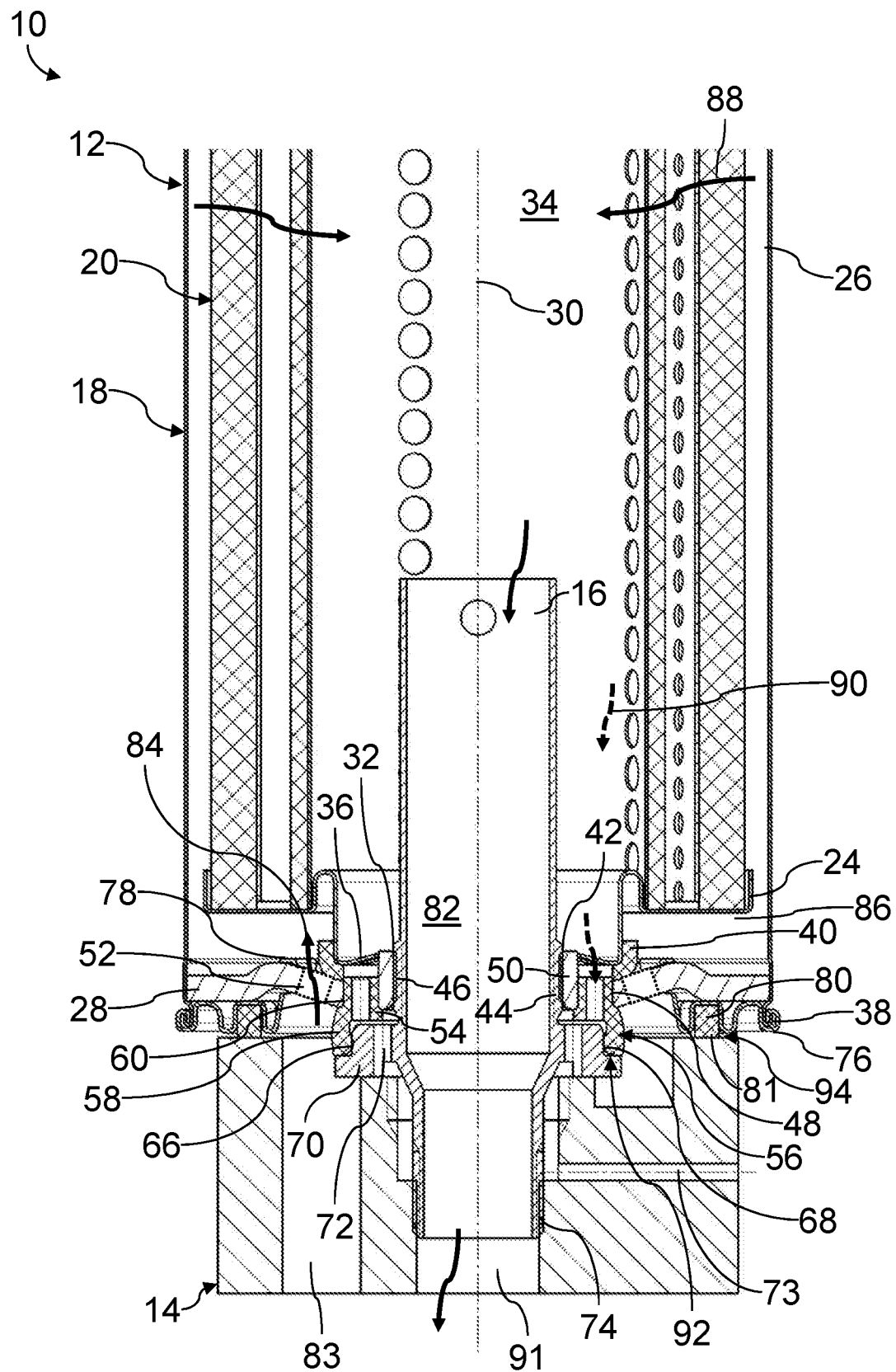
FIG. 1 shows a longitudinal section of an air/oil separation device with an air/oil separation element that is exchangeably connected to a connector head.

In FIGS. 1 through 8, an air/oil separation apparatus 10 and its components are illustrated in different illustrations, section views, and detail views. The air/oil separation apparatus 10 serves for separating oil that is possibly entrained in air from the air and for the filtration of air. The air/oil separation apparatus 10 is used, for example, in compressors, vacuum pumps, compressed air devices, or the like. It can be arranged upstream of an inlet or downstream of an outlet of the corresponding device.

The air/oil separation apparatus 10 comprises an air/oil separation element 12 that can also be referred to as air/oil separator box. The air/oil separation element 12 is exchangeably fastened to a stationary connector head 14, in FIG. 1 at the bottom. The connector head 14 serves as a connector device for corresponding air conduits 83 and 91 and oil conduits 73 for connection to the corresponding device. A hollow tubular socket-type connecting nipple 16 connects the air/oil separation element 12 with the connector head 14. The interior of the connecting nipple 16 is air-conducting.

The oil/air separation element 12 comprises a cup-shaped housing 18. In the housing 18, a filter element 20 that in an exemplary fashion is embodied as an annular coalescing element is arranged as a filter and separating element. As filter medium, the filter element 20 comprises, for example, a glass fiber mat which is coiled several times to an annular shape and at the end faces is delimited by an upper end disk, not shown in the Figures, and a lower end disk 24 which is facing the connector head 14. As a further filter medium, a nonwoven is arranged in the interior of the glass fiber coil.

Figure 2:
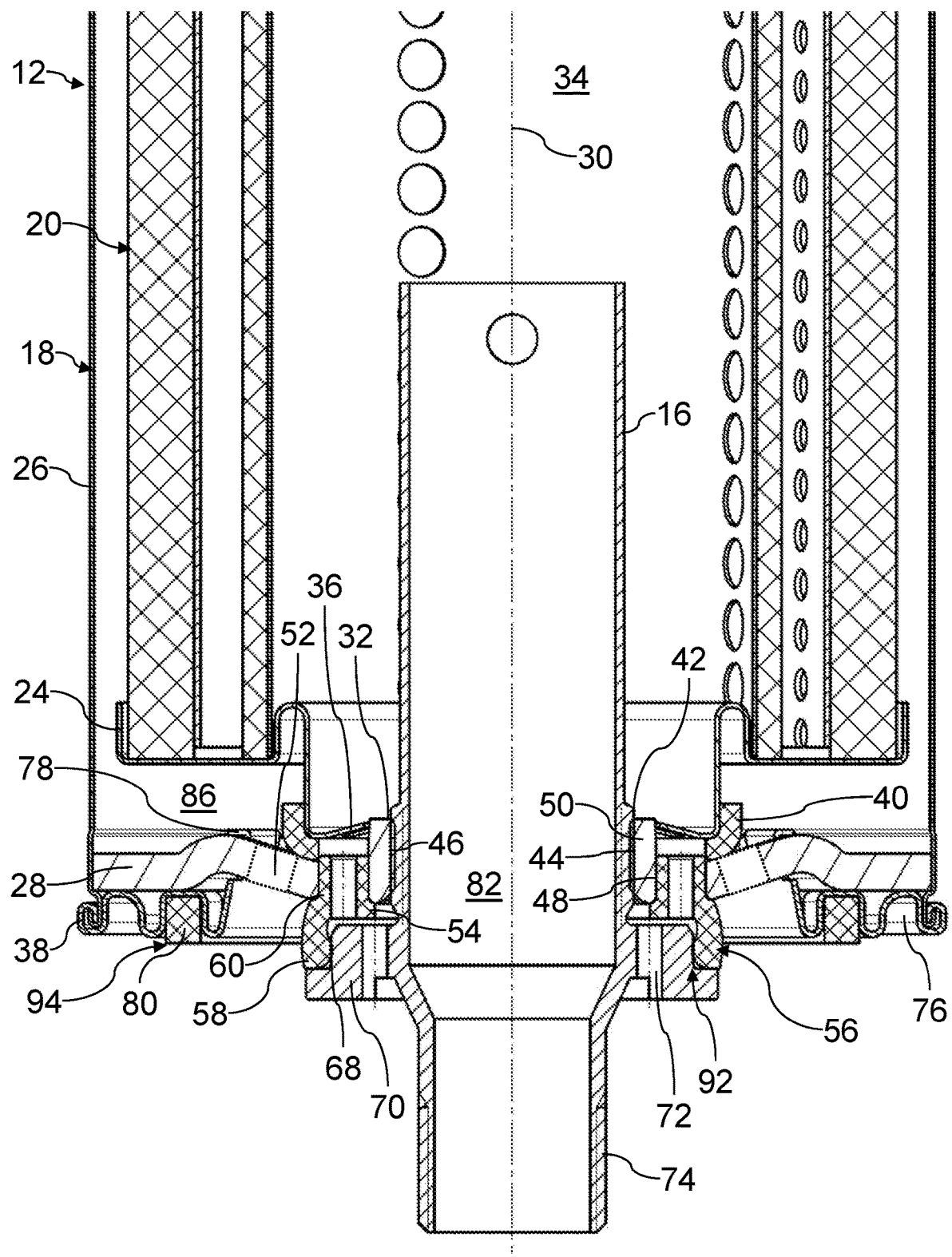
FIG. 2 shows a detail view of the air/oil separation element of FIG. 1 in the region of the housing cover.
Figure 3:
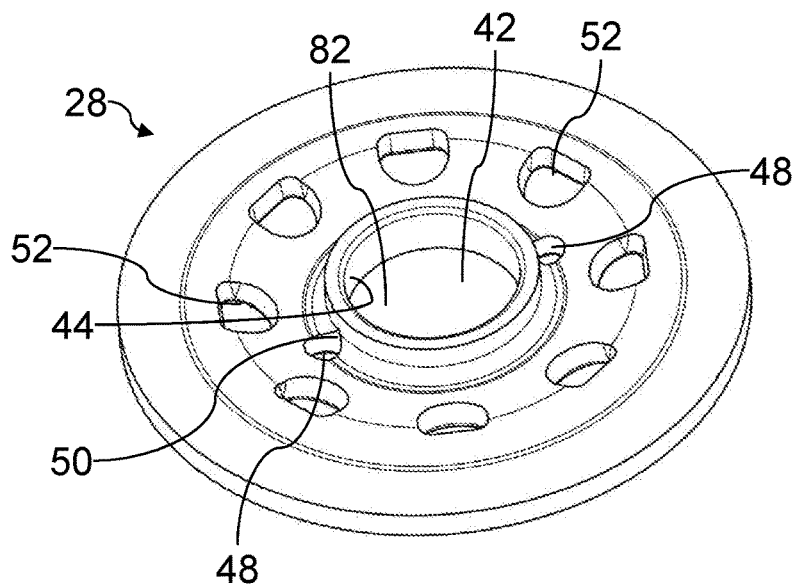
FIG. 3 shows an isometric illustration of a housing cover of the air/oil separation element of FIGS. 1 and 2 with a view of the interior of the housing cover.
Figure 4:
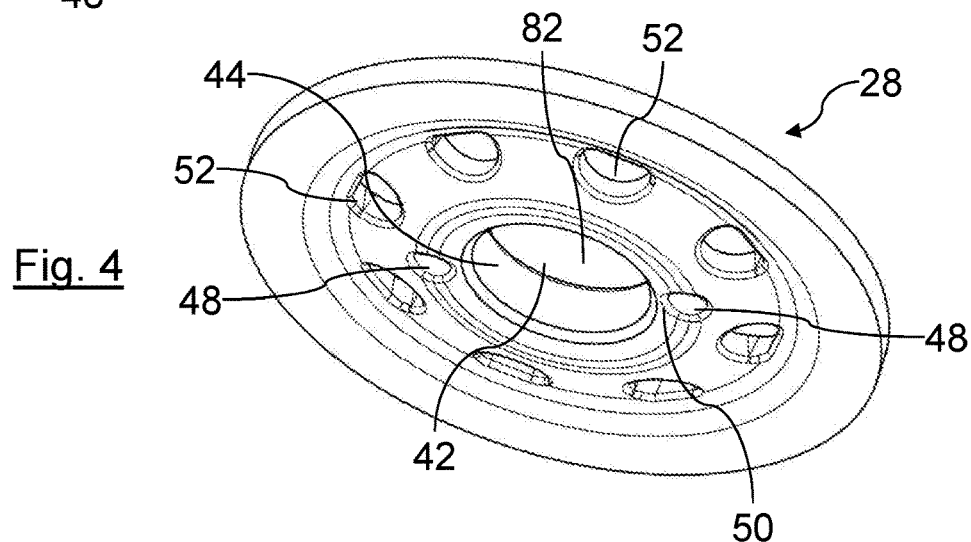
FIG. 4 shows the housing cover of FIG. 3 with a view of its exterior side.
Figure 5:
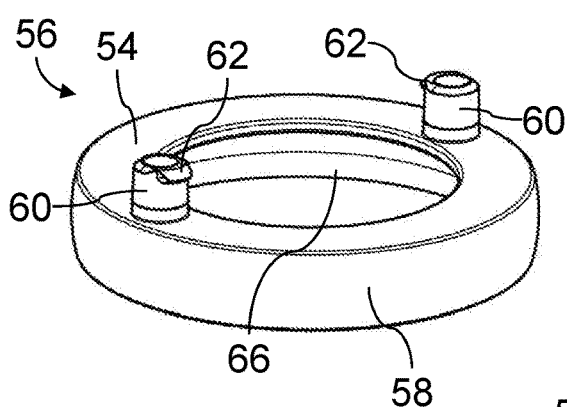
FIG. 5 shows an isometric illustration of an oil drain seal of the air/oil separation element of FIGS. 1 and 2 with a view of its topside facing the housing cover.

In general, the air/oil separation apparatus 10 is arranged in operative position in the orientation which is shown in FIGS. 1 and 2. However, it can also be arranged in different orientations. When in the following "bottom", "top" or the like is mentioned, this relates to the illustration in FIGS. 1 and 2, if nothing else is mentioned.

The housing 18 comprises a housing pot 26 whose opening facing the connector head 14 is closed off by a housing cover 28. The housing pot 26 and the housing cover 28 are made of metal, for example. Alternatively, at least one of the two components can be made of a different type of material, for example, plastic material or can comprise at least one other type of material. The housing cover 28 is shown in detail in FIGS. 3 and 4.

In the air/oil separation apparatus 10 mounted in operative position, the housing 18, the filter element 28, and the connecting nipple 16 are respectively coaxial to an imaginary assembly axis 30. About the assembly axis 30, the air/oil separation element 12 can be screwed by means of the connecting nipple 16 onto the connector head 14 and unscrewed therefrom.

When in the following "radial", "axial", "coaxial" or "circumferential" or the like is mentioned, this relates to the assembly axis 30, if nothing else is mentioned.

Figure 7:
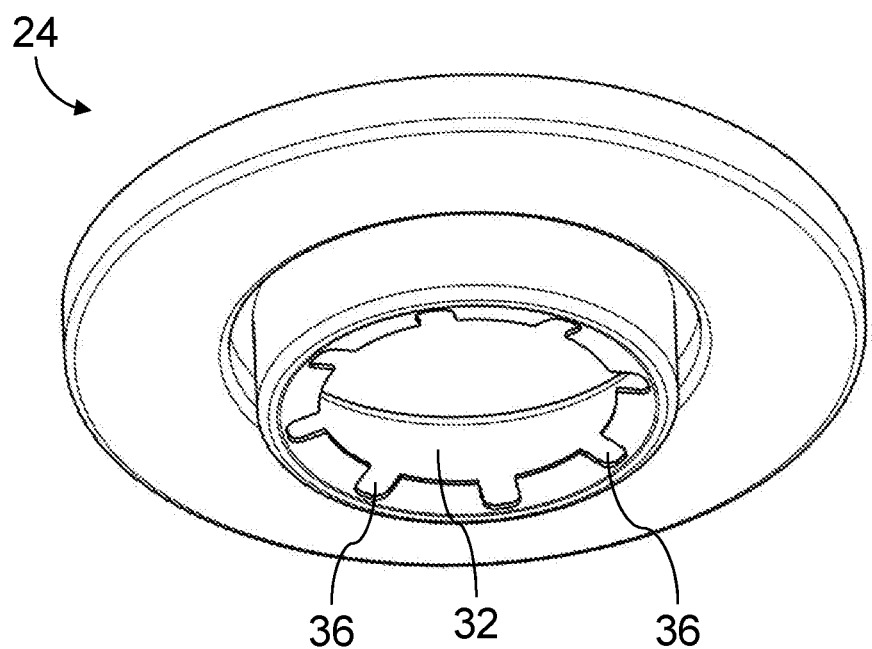
FIG. 7 shows an isometric illustration of a lower end disk of a filter element of the air/oil separation element of FIGS. 1 and 2 facing the housing cover with a view of its outer side.
Figure 8:
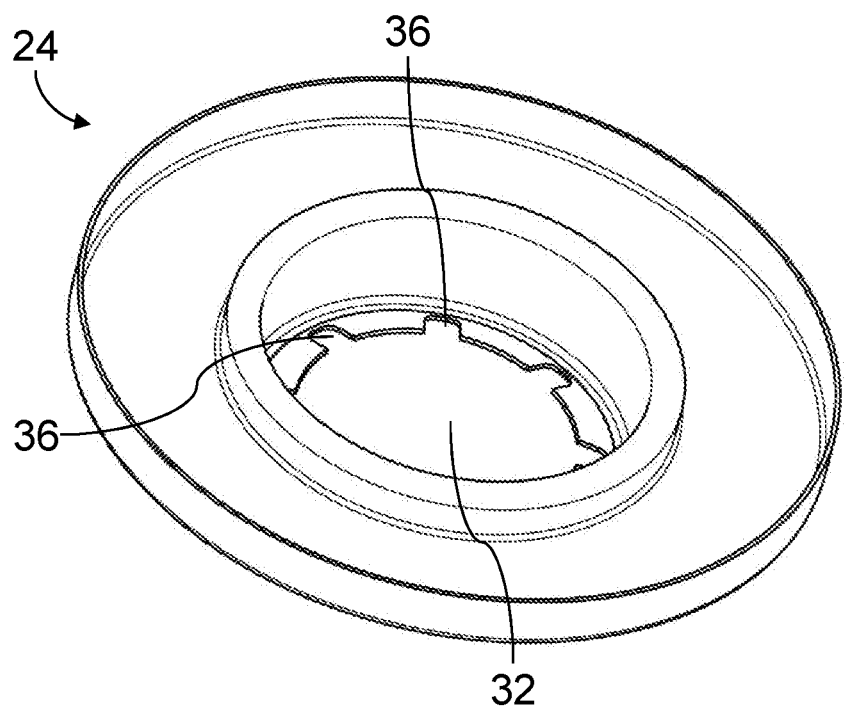
FIG. 8 is in isometric illustration of the lower end disk of FIG. 7 with a view of its interior.

The lower end disk 24, which is facing the housing cover 28 and which is illustrated in detail in FIGS. 7 and 8, is approximately annular. It comprises a coaxial insertion opening 32 for the connecting nipple 16. Radially between the insertion opening 32 and the filter medium of the filter element 20, the lower end disk 24 is bent several times so that a circumferentially extending annular depression results which is open toward an element interior 34 of the filter element 20.

The radial inner rim of the lower end disk 24 surrounds the insertion opening 32. At the radial inner rim of the lower end disk 24, a plurality of passages 36 for separated oil are arranged. The passages 36 are uniformly distributed about the circumference. The passages 36 have each approximately the shape of a slotted hole whose long side extends from the bottom of the aforementioned annular depression in radial direction inwardly. They are open at their radial inner circumferential side, respectively.

The housing cover 28 is secured by means of a securing ring 76 at the housing pot 26, as will be explained in more detail below. The securing ring 76 is connected by means of a crimped connection 38 with the rim of the housing pot 26.

The axial exterior side of the lower end disk 24 which delimits downwardly the annular depression projects past the filter medium in axial direction. A section of the exterior side of the lower end disk 24 which forms the bottom of the annular depression is circumferentially continuously contacting in axial direction a damping ring 40. The damping ring 40 is supported at the axially opposite side on an inner side of the housing cover 28. The damping ring 40 is coaxial to the assembly axis 30. It has an L-shape profile. The damping ring 40 serves inter alia for noise damping, as so-called rattling protection. It limits the axial and radial movability of the filter element 20 in the housing 18 and prevents in this way that rattling noises are generated. Moreover, the damping ring 40 can serve as tolerance compensation and/or for damping the operation-caused vibrations or oscillations.

The housing cover 28 is substantially circular. It is arranged coaxial to the assembly axis 30. In profile, the housing cover 28 is bent approximately in an S shape when viewed radially from the exterior toward the interior.

At its center, the housing cover 28 has a coaxial mounting opening 42 for the connecting nipple 16. A radial inner circumferential wall of the housing cover 28 surrounding the mounting opening 42 is provided with an inner thread 44. The inner thread 44 matches a corresponding outer thread 46 at the radial outer circumferential side of the connecting nipple 16.

Radially outward of the mounting opening 42, the housing cover 28 has two penetrating oil drain holes 48. The oil drain holes 48 are arranged on radial opposite sides relative to the assembly axis 30. Their axes extend parallel to the mounting axis 30. The oil drain holes 48 are separated from the mounting opening 42 by material by means of a circular cylindrical coaxial web section 50.

Along an imaginary coaxial circular line which surrounds the two oil drain holes 48, a plurality of penetrating air inlet holes 52 are arranged. The air inlet holds 52 are each flattened at their radial outer circumferential sides. Imaginary axes of the air inlet holes 52 extend parallel to the assembly axis 30. In FIGS. 1 and 2, two of the air inlet holes 52 are indicated only in dashed lines because they are outside of the respective section planes and therefore are actually hidden.

At the exterior side which is facing away from the filter element 20, a fastening section 54 of an annular coaxial oil drain seal 56 is fastened to the housing cover 28. The oil drain seal 56 serves as a housing-associated oil drain seal part. It is shown in detail in FIGS. 5 and 6. The oil drain seal 56 is monolithic. It is made of an elastic oil-resistant material, for example, fluororubber (FKM).

The fastening section 54 has the shape of a coaxial circular ring disk. At its radial outer circumferential side, the fastening section 54 passes monolithically into a coaxial annular seal section 58 of the oil drain seal 56.

On the axially opposite side of the fastening section 54 opposite the seal section 58, two fastening nipples 60 are arranged. The fastening nipples 60 are monolithically joined with the fastening section 54. The fastening nipples 60 are located on radial opposite sides relative to the assembly axis 30. Respective axes of the fastening nipples 60 extend parallel to the assembly axes. A spacing between the two fastening nipples 60 corresponds to a spacing between the oil drain holes 48 of the housing cover 28. The oil drain holes 48 are designed for connection with the fastening nipples 60. The fastening nipples 60 are inserted respectively into one of the oil drain holes 48. The oil drain seal 56 is secured in the oil drain holes 48 of the housing cover 28. The fastening nipples 60 hold the oil drain seal 56 at the housing cover 28. At their free ends, the fastening nipples 60 each comprise a locking nose 62. By means of the locking noses 62, the fastening nipples 60 lock behind the oil drain holes 48, respectively. The fastening nipples 60 are hollow and form thus an oil channel, respectively.

Figure 6:
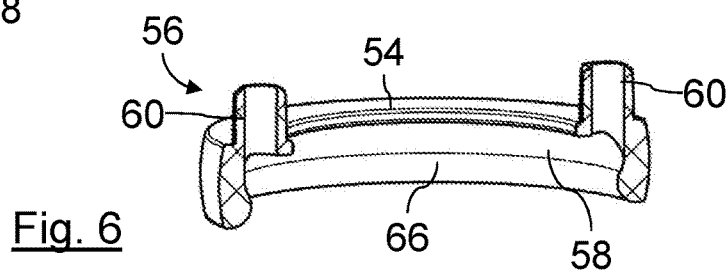
FIG. 6 shows a section of the oil drain seal of FIG. 5.

The seal section 58, as shown in FIG. 6, comprises a convex concave cross-section. The concave side is located radially inwardly. In the region of its free rim which is facing away axially from the housing cover 28, the seal section 58 forms a radial inner sealing surface 66 at the radial inner circumferential side. The radial inner sealing surface 66 is located at the concave side of the convex concave seal section 58. The radial inner sealing surface 66 extends continuously in circumferential direction. The radial inner sealing surface 66 is oriented radially inwardly and is acting seal-tightly in radial inward direction. The radial inner sealing surface 66, as shown in an exemplary preferred embodiment, is in the form of a bead, i.e., the radial inner sealing surface 66 forms locally a preferably convex inwardly projecting region of the seal section 58. The radial inner sealing surface 66 is preferably arranged in the region of the free rim which is facing away axially from the housing cover 28. Due to the arrangement by which the sealing surface is projecting radially inwardly, it is achieved that a contact of the seal section 58 at a cylindrical connection-associated sealing surface 68 is only realized in the region of the radial inner sealing surface 66 and not in the adjoining concave region. The sealing surface 66 has preferably, in the afore described embodiment realized by the convex shape, an insertion ramp in the direction of the free rim which is axially facing away from the housing cover 28. This facilitates assembly. The oil drain seal 56, in particular the seal section 58 or the sealing surface 66, are configured such that during assembly the oil drain seal 56 is elastically widened radially in outward direction so that the pressing force which is required for reaching seal tightness is generated decisively by the elastic expansion. Decisively insofar that in operation a further enhancement, advantageous in operation but not necessarily required, can be generated by the pressure differences which are acting at the oil drain seal 56. Therefore, no additional reinforcements or support sections are required.

When the air/oil separation element 12 is mounted, the radial inner sealing surface 66, as shown in FIGS. 1 and 2, are radially seal-tightly resting against a circumferential connection-associated sealing surface 68. The connection-associated sealing surface 68 has the shape of a coaxial circular cylinder wall. The connection-associated sealing surface 68 is realized at a coaxial radially inwardly positioned circumferential side of a step of a coaxial annular collar 70 of the connection nipple 16. The connection-associated sealing surface 68 is oriented radially outwardly.

The annular collar 70 is circumferentially arranged at the radial outer circumferential side of the connecting nipple 16. In addition to the connection-associated sealing surface 68, the step of the annular collar 70 forms an axial contact surface in the form of an annular disk which is facing the housing cover 28. The free rim of the seal section 58 can rest against the contact surface.

Radially inward of the connection-associated sealing surface 68, several connection-associated oil passages 72 pass through the annular collar 70. Axes of the oil passages 72 extend parallel to the assembly axis 30, respectively. When the air/oil separation apparatus 10 is mounted, the connection-associated oil passages 72 connect an annular gap between the fastening section 54 and the annular collar 70 with an oil drain channel 73 of the connector head 14.

On the side of the annular collar 70 which is axially oppositely positioned relative to the outer thread 46, the connecting nipple 16 has at its radial outer circumferential side a connector outer thread 74 with which the connecting nipple 16 is screwed into a corresponding connector-associated inner thread of the connector head 14.

The securing ring 76 which, for example, is bent from sheet metal several times in radial direction, is connected with the crimped connection 38 radially outwardly to the housing pot 26. The securing ring 76 secures the housing cover 28 at its exterior side. At its radial inner rim the securing ring 76 comprises several securing tabs 78 which each project through one of the air inlet holes 52 of the housing cover 28 and are bent over against its inner side. By means of the securing tabs 78, the housing cover 28 is secured on the securing ring 76.

Moreover, the securing ring 76 comprises radially inside of the crimped connection 38 a coaxial annular circumferentially continuous sealing groove in which a coaxial environmental annular seal 80 is arranged. The environmental annular seal 80 surrounds the air inlet holes 52 radially outwardly. When the air/oil separation element 12 is mounted, the environmental annular seal 80 is positioned axially seal-tightly on a corresponding connector-associated annular coaxial environmental sealing surface 81 of the connector head 14, illustrated in FIG. 1. The environmental sealing surface 81 extends circumferentially and radially. It seals the air inlet holes 52, i.e., the raw air side, relative to the environment.

The mounting opening 42 of the housing cover 28 defines moreover an air outlet opening 82. The interior of the connecting nipple 16 extends through the air outlet opening 82 and thus also defines the course of the air outlet opening 82 in the mounted state. The interior of the connecting nipple 16 forms or delimits so to speak the effective flow cross section of the air outlet opening 82.

In operation of the air/oil separation apparatus 10, air that may be laden with oil droplets flows from the air inlet conduit 83 of the connector head 14 through the air inlet holes 52, indicated in FIG. 1 by an arrow 84, into an inlet chamber 86 of the housing 18. The lower part of the inlet chamber 86 is located in the housing 18 between the lower end disk 24 and the housing cover 28. The upper part of the inlet chamber 86 extends as an annular chamber circumferentially in radial direction outwardly about the filter element 20.

The air flows through the filter medium of the filter element 20 radially from the exterior to the interior, indicated by arrows 88, into the element interior 34. The oil droplets deposit at the radial inner circumferential side of the filter element 20 and flow, following the force of gravity, in downward direction, as indicated in FIG. 1 by dashed arrows 90.

The air, freed from oil droplets, flows at the clean air side through the central air outlet opening 82 in the interior of the connecting nipple 16 out of the air/oil separation element 12 and reaches an air outlet channel 91 of the connector head 14.

The separated oil droplets pass through the hollow fastening nipples 60 into the passages 36 and the oil drain holes 48 of the housing cover 28 into the gap between the fastening section 54 and the annular collar 70. From the gap, the oil passes through the connection-associated oil through openings 72 into the oil drain channel 73 of the connector head 14.

The oil drain seal 56 and the connection-associated sealing surface 68 form a radially acting oil outlet sealing device 92 which separates the oil outlet with the oil drain holes 48 from the raw air side, i.e., the air inlet with the air inlet holes 52. The seal section 58 is not radially supported by support means on its radial outer circumferential side which is facing away from the radial inner sealing surface 66. The radial outer circumferential side of the seal section 58 is facing the air inlet conduit 83 of the connector head 14. In operation, an air pressure of the incoming air is acting thereon and increases in this way the contact pressure of the radial inner sealing surface 66 against the connection-associated sealing surface 68.

Assembly of the oil/air separation apparatus 10 can be realized in various ways.

According to a first exemplary method, the connecting nipple 16 can first be screwed into the mounting opening 42 of the housing cover 28. In doing so, the radial inner sealing surface 66 glides externally along the connection-associated sealing surface 68 until it reaches its end position. The air/oil separation element 12 can be preassembled with the connecting nipple 16 in this way. Subsequently, the air/oil separation element 12, with the free end of the connecting nipple 16, leading, can be screwed axially into the corresponding inner thread of the connector head 14. In axial direction between the housing cover 18 and the connector-associated environmental annular seal surface 81, the environmental annular seal 80 is axially compressed seal-tightly.

The environmental annular seal 80 forms together with the environmental annular sealing surface 81 an environmental sealing device 94.

According to a second exemplary method, the connecting nipple 16 can first be screwed into the corresponding inner thread of the connector head 14. Subsequently, the air/oil separation element 12, with the housing cover 28 leading, can be screwed coaxially to the assembly axis 30 onto the connecting nipple 16. In doing so, the oil outlet sealing device 92 and the environmental sealing device 94 are automatically activated, respectively.

For removal, the air/oil separation element 12 is either unscrewed from the connecting nipple 16 relative to the assembly axis 30 or the air/oil separation element 12 is unscrewed together with the connecting nipple 16 from the connector head 14.

What is claimed is:

1. A housing of a device for separating at least one fluid from gas, wherein the housing comprises:
   at least one first gas passage centrally arranged relative to an axis of the housing;
   at least one second gas passage arranged radially outwardly of the at least one first gas passage relative to the axis;
   at least one fluid outlet for fluid separated from the gas;
   wherein the at least one fluid outlet, relative to the axis, is arranged radially between the at least one first gas passage and the at least one second gas passage;
   at least one fluid outlet seal part of at least one fluid outlet sealing device,
      wherein the at least one fluid outlet seal part is arranged fluidically between the at least one second gas passage and the at least one fluid outlet and is configured to interact seal-tightly with at least one corresponding fluid outlet seal part of a connection part provided for connecting the housing to a connector device;
   wherein the at least one fluid outlet seal part of the at least one fluid outlet sealing device comprises at least one annular seal section comprising
      at least one at least radially inwardly acting sealing surface and/or
      comprising at least one at least radially outwardly acting sealing surface;
   wherein the at least one fluid outlet seal part of the at least one fluid outlet sealing device comprises
      a radial inner sealing surface,
   wherein, at least in a region of the radial inner sealing surface, the at least one fluid outlet seal part of the at least one fluid outlet sealing device has no support associated therewith in a radial outward direction relative to the axis so that the at least one fluid outlet seal part of the at least one fluid outlet sealing device is not radially supported in the radial outward direction by a part of the housing or by the connector device or by the connection part.

2. The housing according to claim 1, wherein
   the at least one fluid outlet seal part of the at least one fluid outlet sealing device comprises
      at least one annular seal section comprising a convex concave cross section at least over portions thereof.

3. The housing according to claim 1, wherein
   the at least one fluid outlet seal part of the at least one fluid outlet sealing device comprises
      at least one fastening section and is configured to be fastened with the at least one fastening section to at least one housing part of the housing.

4. The housing according to claim 1, wherein
the at least one corresponding fluid outlet seal part of the connection part comprises
a radial outer circumferential side relative to the axis and
the radial outer circumferential side comprises at least one step,
wherein the at least one step comprises
a radially inwardly positioned circumferential side comprising a radial outwardly oriented sealing surface,
wherein the at least one fluid outlet seal part of the at least one fluid outlet sealing device comprises
at least one radially inwardly acting sealing surface configured to interact with the radial outwardly oriented sealing surface.

5. The housing according to claim 1, wherein
the at least one first gas passage comprises
a mounting opening configured to receive the connection part.

6. The housing according to claim 1, further comprising a housing cover,
wherein at least one of the elements selected from the group consisting of the at least one gas passage; the at least one fluid outlet; the at least one fluid outlet seal part of the at least one fluid outlet sealing device; at least one environmental seal part; and combination thereof are realized at the housing cover.

7. An apparatus comprising:
at least one connector device;
at least one device for separating at least one fluid from gas configured to be connected to the at least one connector device;
wherein the device for separating at least one fluid from gas comprises at least one housing according to claim 1.

8. A housing of a device for separating at least one fluid from gas, wherein the housing comprises:
at least one first gas passage centrally arranged relative to an axis of the housing;
at least one second gas passage arranged radially outwardly of the at least one first gas passage relative to the axis;
at least one fluid outlet for fluid separated from the gas;
wherein the at least one fluid outlet, relative to the axis, is arranged radially between the at least one first gas passage and the at least one second gas passage;
at least one fluid outlet seal part of at least one fluid outlet sealing device,
wherein the at least one fluid outlet seal part is arranged fluidically between the at least one second gas passage and the at least one fluid outlet and is configured to interact seal-tightly with at least one corresponding fluid outlet seal part of a connection part provided for connecting the housing to a connector device;
wherein the at least one fluid outlet seal part of the at least one fluid outlet sealing device comprises at least one annular seal section comprising
at least one at least radially inwardly acting sealing surface and/or
comprising at least one at least radially outwardly acting sealing surface;
wherein the at least one fluid outlet seal part of the at least one fluid outlet sealing device comprises
at least one fastening section and is configured to be fastened with the at least one fastening section to at least one housing part of the housing;
wherein the at least one fastening section comprises
at least one hollow fastening nipple.

9. The housing according to claim 8, wherein
the at least one fastening section is configured to be connected to the at least one fluid outlet.

10. A fluid outlet seal part of a fluid outlet sealing device of a housing of a device for separating at least one fluid from gas, wherein
the fluid outlet seal part comprises:
an annular outer wall surrounding an open interior, the annular outer wall having at least one radially inwardly acting sealing surface and/or with at least one radially outwardly acting sealing surface;
an annular fasting section formed on an axial end of the annular outer wall, the annular fastening section projecting radially inward from the annular outer wall into the open interior;
at least two fastening nipples formed on an axially outer side of the annular fasting section and projecting axially outward away from the fluid outlet seal part, the at least two fastening nipples having a flow opening extending axially through the at least two fastening nipples into the open interior of the annular outer wall;
wherein the at least two fastening nipples are spaced apart across a central opening of the annular fastening section;
wherein the at least two fastening nipples are configured to engage into drain holes of a housing cover to mount the annular seal part to the housing cover of the housing;
wherein the fluid outlet seal part is configured to be arranged fluidically between at least one gas passage and at least one fluid outlet of the housing such that the fluid outlet seal part interacts seal-tightly with at least one corresponding fluid outlet seal part of a connection part provided for connecting the housing to a connector device of the device for separating at least one fluid from gas.

11. The fluid outlet seal part according to claim 10, wherein
the at least one radially inwardly acting sealing surface is a radially inwardly projecting sealing surface and
wherein the at least one radially outwardly acting sealing surface is a radially outwardly projecting sealing surface.

12. A device for separating at least one fluid from gas, the device comprising:
a housing comprising
at least one first gas passage centrally arranged relative to an axis of the housing,
at least one second gas passage arranged radially outwardly of the at least one first gas passage relative to the axis, and
at least one fluid outlet for fluid separated from the gas arranged radially between the at least one first gas passage and the at least one second gas passage relative to the axis;
at least one fluid outlet seal part of at least one fluid outlet sealing device arranged at the housing between the at least one second gas passage and the at least one fluid outlet and configured to interact seal-tightly with at least one corresponding fluid outlet seal part of a connection part provided for connecting the housing to a connector device;

at least one filtering and/or separating element configured to be arranged in the housing and configured to separate the at least one first gas passage and the at least one second gas passage from each other;

wherein the at least one fluid outlet seal part of the at least one fluid outlet sealing device arranged at the housing comprises at least one annular seal section comprising at least one radially inwardly acting sealing surface and/or comprising at least one radially outwardly acting sealing surface;

wherein the at least one fluid outlet seal part of the at least one fluid outlet sealing device comprises a radial inner sealing surface, wherein, at least in a region of the radial inner sealing surface, the at least one fluid outlet seal part of the at least one fluid outlet sealing device has no support associated therewith in a radial outward direction relative to the axis so that the at least one fluid outlet seal part of the at least one fluid outlet sealing device is not radially supported in the radial outward direction by a part of the housing or by the connector device or by the connection part.

* * * * *